April 19, 1960 J. J. HAGOPIAN 2,933,721
GATED MAGNETIC RECORDING HEAD
Filed May 22, 1957 3 Sheets-Sheet 1
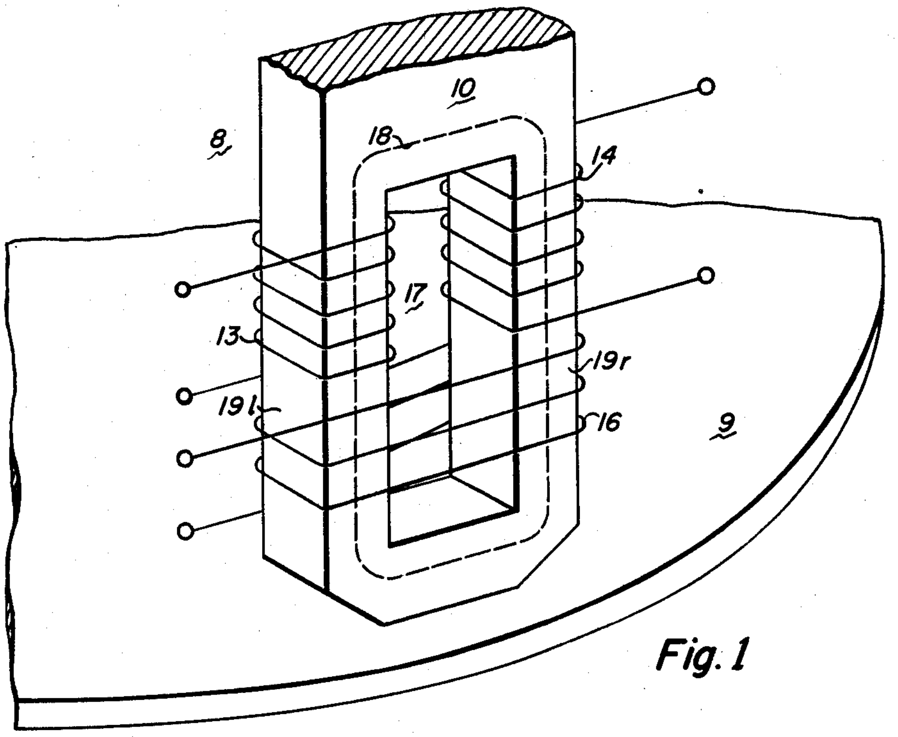
Fig. 1
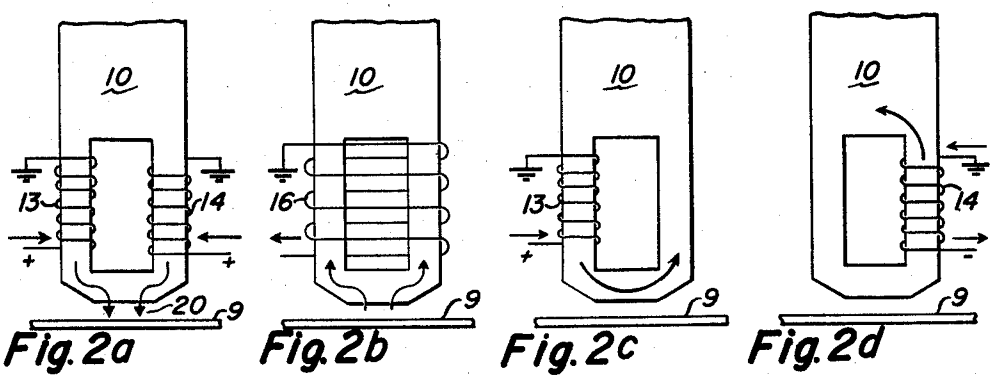
Fig. 2a Fig. 2b Fig. 2c Fig. 2d
Fig. 2
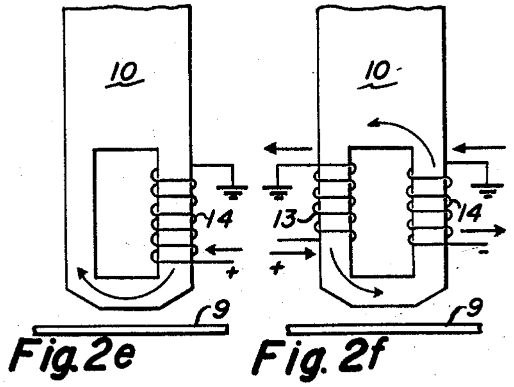
Fig. 2e Fig. 2f
INVENTOR.
JACOB J. HAGOPIAN
BY
Richard C. Cummins
ATTORNEY April 19, 1960 J. J. HAGOPIAN 2,933,721

GATED MAGNETIC RECORDING HEAD

Filed May 22, 1957 3 Sheets-Sheet 2

April 19, 1960 J. J. HAGOPIAN 2,933,721

GATED MAGNETIC RECORDING HEAD

Filed May 22, 1957 3 Sheets-Sheet 3

United States Patent Office 2,933,721

Patented Apr. 19, 1960

2,933,721

GATED MAGNETIC RECORDING HEAD

Jacob J. Hagopian, Santa Clara County, Calif., assignor to International Business Machines Corporation, New York, N.Y., a corporation of New York Application May 22, 1957, Serial No. 660,974

13 Claims. (Cl. 340—174)

This invention relates in general to magnetic transducers and in particular to an improved gated magnetic recording head which may be selectively controlled from a two-dimensional matrix.

Where coded information is to be stored in the form of magnetized areas on a movable record member having a plurality of closely spaced recording tracks, it is sometimes advantageous to employ a plurality of recording heads each permanently associated with a different track rather than to employ a single transducer which is selectively positioned from one track to another. The advantages of employing a plurality of permanently positioned recording heads are that, first, accurate positioning mechanisms for the transducer may be eliminated from the apparatus and, second, the access time required to reach a particular address may be reduced since it is only necessary to switch from one transducer to another.

Various arrangements for switching from one transducer to another have been suggested in the prior art. For example, where a relatively large number of heads are employed, it has been suggested that the switching means may be simplified considerably by employing gated type recording heads operated from a two-dimensional matrix. In such arrangements each head is provided with a control winding and a winding or windings for recording and sensing recorded data, commonly referred to as a read/write winding, the control winding being arranged to saturate a portion of the magnetic circuit through which the flux caused by the read/write signal would normally pass. Selection of a particular transducer for writing may therefore be obtained by energizing the "$x$" input line associated with the selected head with write signals and the "$y$" input lines not associated with the selected head with control signals to prevent the flux caused by the write signals from flowing in the magnetic circuit of the unselected transducers. Selection of a particular head for reading is accomplished in a similar manner. It will be seen that the successful operation of this arrangement depends on the extent to which the control windings can saturate the cores which are not selected. It has been found that for various reasons it is not always possible to block all the flux caused by the write signals supplied to the unselected transducers and, as a result, previously written information passing under the unselected heads whose write windings are energized may be adversely affected.

The present invention provides gated magnetic transducers which may be selectively controlled from a two-dimensional matrix without adversely affecting the operation of the unselected transducers during a writing operation of the selected transducer. In the improved gated magnetic transducer selective directional excitation of either of two magnetizing windings positioned on the core causes magnetic flux either to confine itself to the core prior to selection or to flow out of the core during writing or recording. Excitation of either winding singly or both windings jointly in an additive relation saturates the core and prevents reading while, with no excitation on either winding, the remanent flux from the storage medium changes the magnetization in the core and generates a signal in a sensing winding positioned on the core.

It is therefore an object of the present invention to provide an improved gated magnetic transducer.

A further object of the present invention is to provide a magnetic transducer wherein the gating action is obtained by a flow of flux around a closed magnetic circuit defined by a portion of the core.

A still further object of the present invention is to provide a plurality of magnetic transducers each of which may be selectively controlled by means of a two-dimensional matrix.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a greatly enlarged perspective view of a perpendicular recording magnetic transducer embodying the present invention.

Figs. 2A through 2F illustrate diagrammatically various conditions of the transducer shown schematically in Fig. 1.

Figure 3:
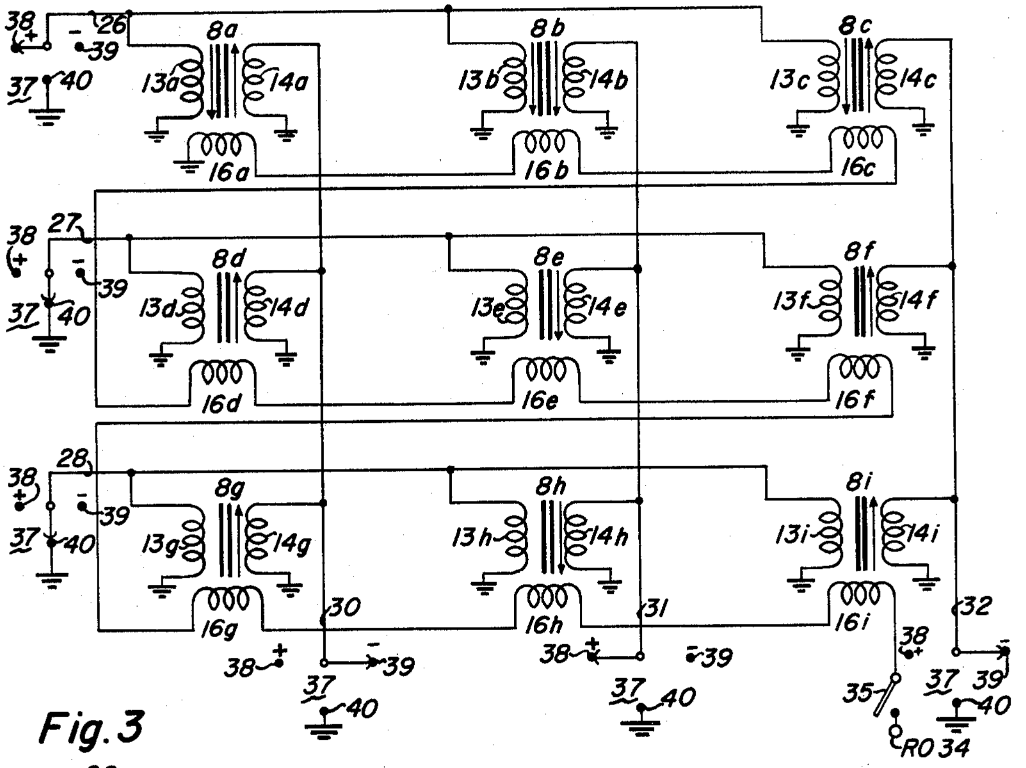
Fig. 3 is a schematic view illustrating how a two-dimensional matrix may be employed for selecting one of a plurality of transducers of the type shown in Fig. 1 to perform a writing operation.

Referring to the drawings and particularly to Fig. 1, the magnetic transducer 8 shown in recording relationship with a record member 9 comprises a perpendicular type recording probe 10, a control winding 13, a write winding 14, and a sensing or read winding 16. The distal end of the probe 10 is provided with a window 17 which creates a closed magnetic circuit 18 in the portion of the probe which defines the window. Control winding 13 and write winding 14 are positioned on the core to cause flux to flow around the magnetic circuit in predetermined directions depending on whether a read operation, a write operation or a blocking operation is desired. Preferably, control winding 13 is wound on portion 19L of the probe 10 and write winding 14 is wound on portion 19R. Sensing winding 16 may be wound around the distal end of the probe, wound completely on either portion 19R or 19L, or wound on both portions in additive series relationship.

Figs. 2A through 2F illustrates diagrammatically how the windings 13 and 14 may be selectively energized to cause flux to flow around the magnetic circuit 18 in predetermined directions depending on the particular operation desired. If a write operation is desired, control winding 13 is energized to cause flux to flow in one direction, e.g., counterclockwise, while write winding 14 is energized simultaneously to cause flux to flow in the opposite direction. As a result of the opposite flow of the fluxes generated by the respective windings, a writing flux is forced to flow out of the core across the gap 20 to record member 9, as shown in Fig. 2A.

If a reading operation is desired, both windings 13 and 14 (not shown) are deenergized, in which case remanent flux from record member 9 changes the magnetization in the probe 10, thereby generating a signal in read winding 16, as shown in Fig. 2B.

Figs. 2C through 2F illustrate four separate arrangements for obtaining a blocking condition where the transducer can neither read nor write. In Fig. 2C the blocking condition is obtained by energizing only control winding 13, causing flux to flow in one direction around the closed magnetic path 18, which saturates the probe and prevents magnetization of the record member from inducing a signal in read winding 16 (not shown). Figs. 2D and 2E illustrate how the blocking condition for the transducer may be obtained by selective energization of write winding 14, control winding 13 (not shown) being deenergized. Fig. 2F illustrates how the blocking condition may be obtained when both windings 13 and 14 are selectively energized to cause flux to flow around magnetic path 18 in the same direction. It will be seen that a gated magnetic transducer is provided wherein the write operation is under the control of winding 13 and the read operation is under the control of either control winding 13 or write winding 14.

Figure 4:
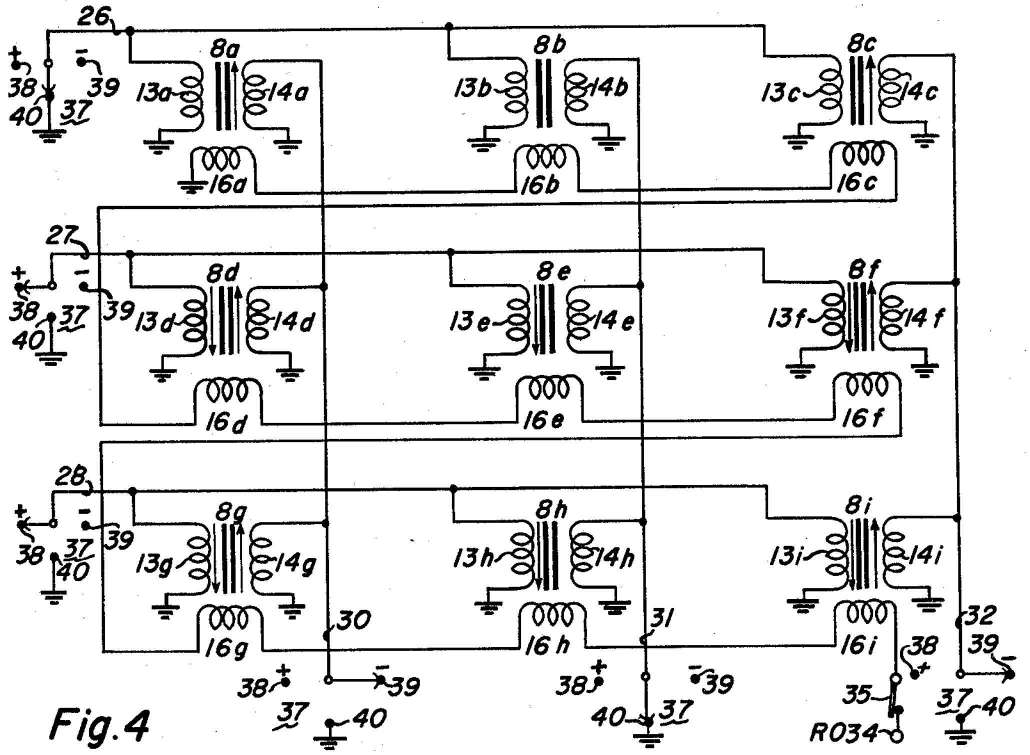
Fig. 4 is a view similar to Fig. 3 showing how a two-dimensional matrix may be employed to select a particular head of the type shown in Fig. 1 for a reading operation.

The advantages of providing a gated magnetic transducer which operates in the manner just described may be readily seen by referring to Figs. 3 and 4 which are diagrammatic illustrations of a plurality of transducers 8a through 8i of the type shown in Fig. 1 being controlled from a two-dimensional matrix. In practice each transducer 8 shown in Figs. 3 and 4 may be permanently associated with a different track of a record member so that data may be obtained from any track or recorded on any track by suitably controlling the input lines of the matrix.

As shown in Fig. 3, which illustrates how a particular transducer may be selected for a writing operation, the control windings 13a through 13c are connected to the "x" input line 26, control windings 13d through 13f to "x" input line 27, and control windings 13g through 13i to "x" input line 28. The write windings 14a, 14d and 14g are connected to "y" input line 30, write windings 14b, 14e and 14h to "y" input line 31, and write windings 14c, 14f and 14i to "y" input line 32. Sensing windings 16a through 16i are connected in series to a readout tap RO34 through switch 35. Means are also provided for selectively energizing the input lines of the matrix to control the operation of transducers 8a through 8i. This means may comprise switch means 37 selectively operable to connect each line to a positive tap 38, a negative tap 39 or a ground tap 40.

In order to cause a particular transducer to write, for example, transducer 8b, the "x" input line 26 connected to control winding 13b is energized to cause flux to flow around the magnetic path in one direction and the "y" input line 31 connected to write winding 14b is energized to cause flux to flow around the magnetic path in the opposite direction. The condition of the core of transducer 8b is identical to that represented by the transducer shown in Fig. 2A. As will be seen, the control and write windings of transducers 8a and 8c are also energized. However, the direction of energization of each winding is such that the resulting fluxes add rather than oppose and, hence, these transducers are in the blocking condition similar to that represented by the transducer shown in Fig. 2F. The remaining transducers are also in a blocking condition, the condition of transducers 8d, 8f, 8g and 8i being similar to that of the transducer shown in Fig. 2D while the condition of transducers 8e and 8h may be represented by the transducer shown in Fig. 2E.

The selection of any other head in the arrangement to perform a writing operation is obtained by operating switch means 37.

The read operation for a particular transducer is controlled by deenergizing both the control winding and the write winding of the selected transducer while maintaining at least one winding of the remaining transducers energized to prevent their respective sensing windings from being energized by the remanent flux of the record member. As shown in Fig. 4, the input lines of the matrix are connected so that transducer 8b is selected to read, "x" input line 26 and "y" input line 31 being deenergized. As will be seen, the cores of the remaining transducers are saturated to render their respective sensing windings 16 inoperable by exciting the control winding 13, the write winding 14, or both windings 13 and 14 so that the resulting fluxes are in an adding relationship. Transducers 8d, 8f, 8g and 8i have both windings energized in additive relationship. Transducers 8e and 8h have only the control winding 13 energized, and transducers 8a and 8c have only the write winding 14 energized. Sensing winding 16b therefore supplies readout signals to readout tap RO34 representative of the information being read by transducer 8b.

Figures 5, 6, 6A, 6B, 6C:
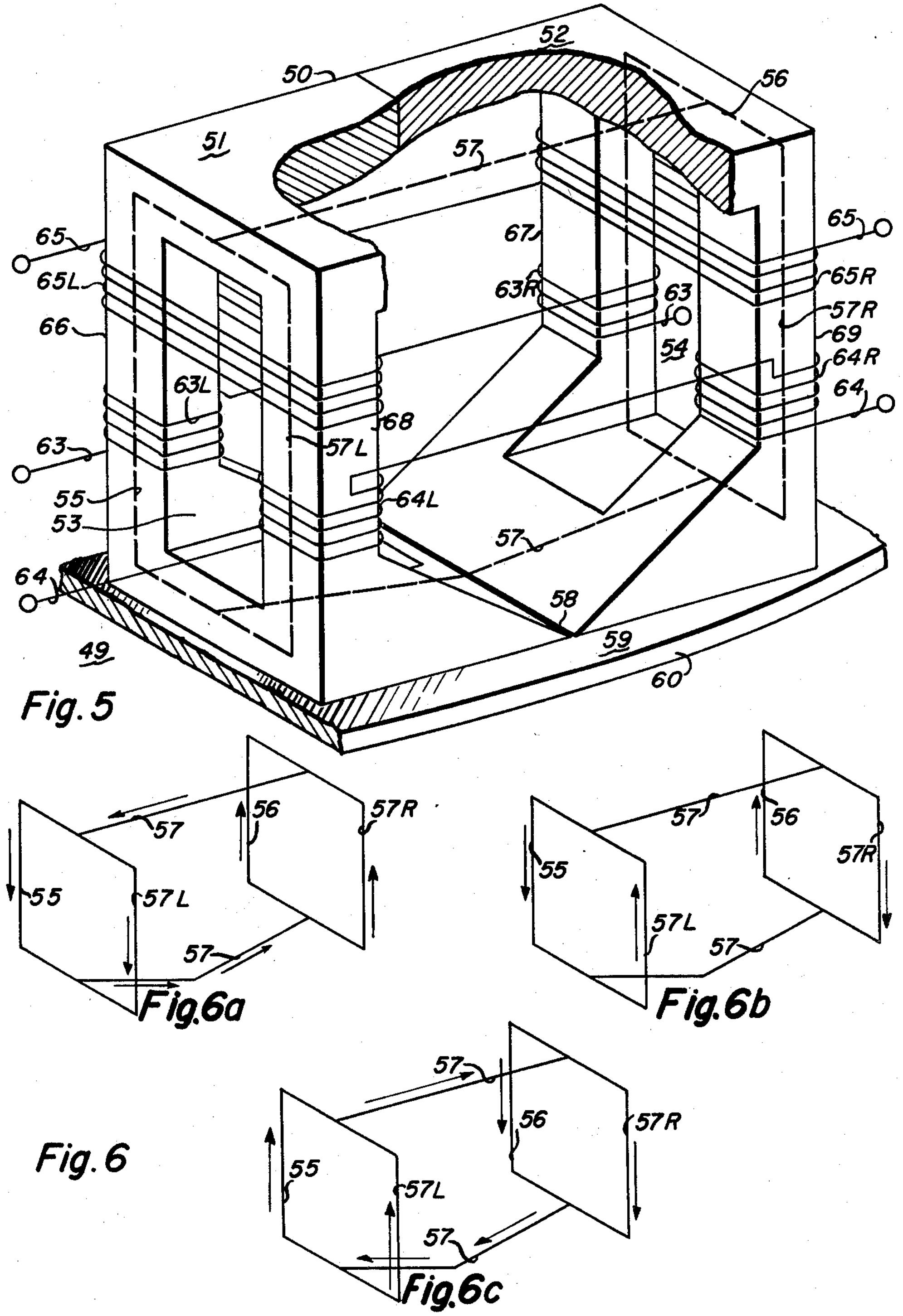
Fig. 5 is an enlarged perspective view of a longitudinal type recording head embodying the present invention.
Figs. 6A through 6C illustrate diagrammatically the flux paths present in the transducer shown in Fig. 5 under the blocking, writing and reading conditions.

Fig. 5 is a greatly enlarged perspective view partly in section of a longitudinal type magnetic recording transducer embodying the present invention. As shown therein, the transducer 49 comprises a magnetic core 50 having a pair of C-shaped core portions 51 and 52 which are provided respectively with windows 53 and 54. Window 53 creates a first closed magnetic circuit 55 in core portion 51 while window 54 creates a second closed magnetic circuit 56 in C-shaped portion 52. C-shaped portions 51 and 52 are positioned to define jointly a third magnetic circuit 57 provided with an air gap 58 which is positionable adjacent the magnetizable surface 59 of record member 60. Magnetic circuit 57 has one section 57L which is common to the first magnetic circuit 55 and a second section 57R which is common to the second magnetic circuit 56.

Transducer 49 further includes first winding means 63 positioned on core 50 to cause flux to flow around magnetic circuits 55 and 56 in predetermined directions, second winding means 64 positioned on core 50 to cause flux to flow around magnetic circuits 55 and 56 in directions opposite to the predetermined directions in response to selective directional energization thereof by write signals, and a sensing winding 65 disposed on core 50 to provide read signals in accordance with the change in magnetization of core 50 caused by remanent flux from record member 60 when winding means 63 and 64 are deenergized.

In this instance first winding means 63 includes a coil 63L wound on leg portion 66 and coil 63R wound on leg portion 67. Winding means 63 is energized by means (not shown) so that flux is caused to flow around magnetic circuit 55 counterclockwise and around magnetic circuit 56 clockwise, as shown in Fig. 5. Winding means 64 includes a coil 64L wound on leg portion 68 and a coil 64R wound on leg portion 69. Write signals energize winding means 64 so that flux flows around magnetic circuit 55 clockwise and around magnetic circuit 56 counterclockwise, which causes flux to flow across gap 58 and around magnetic circuit 57 counterclockwise, as viewed in Fig. 5.

Sensing winding 65 comprises a coil 65L wound around both leg portions 66 and 68 of C-shaped core portion 51 and a coil 65R wound about both leg portions 67 and 69 of C-shaped core portion 52. Sensing winding 65 provides read signals from record member 60 whenever winding means 63 and 64 are deenergized. Sensing winding 65 is prevented from providing read signals by energizing either winding means 63 or winding means 64 singly, or both winding means simultaneously in a direction to cause the resulting fluxes to add.

Figs. 6A through 6C are diagrammatic illustrations of the flow of flux through the magnetic circuits of core 50 for three types of operating conditions. Fig. 6A shows the flux paths during a writing operation, Fig. 6C the flux paths during a reading operation, and Fig. 6B the flux paths during a blocking operation where the transducer can neither read nor write.

It will be readily apparent to those skilled in the art that transducer 49 may be operated from a two-dimensional matrix in a manner similar to that described in connection with Figs. 3 and 4. It should further be noted with respect to transducer 49 that while the core 50, as shown, comprises two C-shaped portions, a one-piece core may also be employed. Likewise, the core may be provided with only one window in a leg rather than a window in both legs, but under most conditions a window in each leg is preferable.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A gated magnetic recording transducer comprising a core positionable to define a portion of a main series magnetic circuit including an air gap and a magnetizable record member, said core having a window to provide a second closed magnetic circuit having a reluctance less than the reluctance of said series magnetic circuit and including a pair of parallel branches each of which is in series with the portion of said main circuit defined by said core, a control winding disposed on a window defining portion of said core corresponding to one of said branches to cause flux to flow around said second circuit in a predetermined direction in response to control signals of preselected polarity, and a recording winding disposed on a window defining portion of said core corresponding to the other of said branches to cause flux to flow around said second circuit in the opposite direction in response to a predetermined signal whereby flux is forced from said core to perform a recording operation.

2. The invention set forth in claim 1 including a sensing winding disposed on said core and operable to provide a read signal only when both said control winding and said recording winding are deenergized.

3. A transducer comprising a perpendicular magnetic recording probe positionable with its distal end in recording relationship with a magnetizable surface to define a first magnetic circuit, said probe having a window providing a second magnetic circuit having a reluctance less than the reluctance of said first magnetic circuit and including a pair of parallel branches each of which is in series with the portion of said first circuit defined by the probe, a first winding positioned on a window defining portion corresponding to one of said branches responsive to control signals for causing a flow of flux around said second magnetic circuit in a predetermined direction to saturate the portion of that circuit immediately adjacent said magnetizable surface, and a second winding positioned on a window defining portion corresponding to the other of said branches responsive to a recording signal for causing a flow of flux around said second circuit in the opposite direction resulting in a flow of flux substantially perpendicular to said surface from said immediately adjacent portion.

4. The invention set forth in claim 3 including a sensing winding disposed on said probe to provide a signal in accordance with the remanent magnetization of said magnetizable surface when said first and second windings are deenergized.

5. A gated magnetic recording transducer comprising a core member having a first part defining a portion of a first flux path which includes an air gap and a magnetizable record member, and a second part defining a second flux path having a reluctance less than the reluctance of said first path and in shunt with the section of said first flux path defined solely by said first part, a recording winding disposed on one of said parts of said core member to cause flux to flow around said second path in a predetermined direction in response to energizing said winding with recording signals, and a control winding disposed on the other of said parts to cause flux to flow around said first path in response to said control winding being energized with control signals of only one polarity simultaneously with said recording signals.

6. A recording apparatus comprising in combination a gated magnetic recording transducer and a magnetizable record member disposed in recording relationship with said transducer, said transducer comprising a core member defining a portion of a first flux path which extends in part through said core member substantially normal to the surface of said record member, said core member including a pair of parallel branches which define a winding receiving window, a first winding disposed on a window defining portion of said core member corresponding to one of said branches to cause flux to flow through said branches serially in response to energizing said first winding with first signals, a second winding disposed on a window defining portion of said core member corresponding to said other parallel branch to cause flux to flow in said first path in response to selective energization of said second winding in a predetermined direction by a second signal applied simultaneously with said first signal.

7. The combination set forth in claim 6 including a sensing winding disposed on said core operable to provide a read signal only when both said first and second windings are deenergized.

8. In apparatus for recording information on and reading information from a magnetizable record member having a plurality of record tracks, the combination comprising a plurality of gated magnetic transducers each of which is associated with a different said track and a matrix arrangement for controlling the reading and writing operation of a preselected transducer, each of said transducers comprising a core positioned in flux transmitting relationship with a predetermined said track, means including a first portion of said core defining a first flux path, means including a second portion of said core defining a second flux path in shunt with said first flux path, a first winding disposed on said first portion of said core to cause a flow of flux around said second path in one direction, a second winding disposed on said second portion of said core to cause flux to flow around said second path in the opposite direction to magnetize said record member in response to predetermined directional, excitational signals supplied to said second winding, said matrix including a plurality of "$x$" input lines and a plurality of "$y$" input lines, means connecting predetermined groups of said first windings with different ones of said "$x$" input lines, means connecting predetermined groups of said second windings to different ones of said "$y$" input lines, and means for selectively energizing said lines to cause one said second winding of only one said transducer to be supplied with said predetermined directional, excitational signals to cause said selected transducer to write.

9. The invention set forth in claim 8 including a read winding for each of said transducers, a readout tap and means for connecting said read windings in series to said readout tap.

10. A gated magnetic recording transducer comprising a core member provided with a main window creating a first magnetic circuit and a second window creating a second closed magnetic circuit, one section of which is common to said first circuit, said first circuit including an air gap for causing a longitudinal type of magnetization on the surface of a record member positioned adjacent said gap, a first winding positioned on the portion of said core corresponding to said common section to cause flux to flow around said second circuit in a predetermined direction, a second winding positioned on the portion of said core corresponding to the remaining section of said second circuit to cause flux to flow through said common section in a direction opposite to said predetermined direction in response to selective directional energization thereof whereby flux is caused to flow through said gap around said first circuit.

11. The invention set forth in claim 10 including a sensing winding positioned on said core member and operable to provide a read signal in accordance with the change in magnetization of the core member caused by remanent flux of the record member when said first and second windings are deenergized.

12. A gated magnetic recording transducer comprising in combination a pair of C-shaped core members each provided with a window to create first and second closed magnetic circuits, said C-shaped members being arranged to define jointly a third magnetic circuit having an air gap positionable adjacent a recording medium and operable to magnetize longitudinally the surface of said medium in accordance with the flow of flux across said gap, said third magnetic circuit having a first section common to said first magnetic circuit and a second section common to said second magnetic circuit, first winding means disposed on core portions corresponding respectively to the sections of said first and second circuits which are common to said third circuit for causing flux to flow around said first and second circuits in predetermined directions in response to first signals, second winding means disposed on other core portions corresponding respectively to the remaining sections of said first and second circuits, said second winding means being selectively energizable by write signals to cause flux to flow through said first and second circuits in directions opposite to said predetermined directions resulting in a flow of flux through said gap around said first circuit.

13. The combination recited in claim 12 including a sensing winding associated with said core members selectively operable in response to joint deenergization of said winding means to provide read signals in accordance with changes in magnetization of said core members caused by the remanent flux of said recording medium.

References Cited in the file of this patent

UNITED STATES PATENTS

| | | |
|---|---|---|
| 1,858,553 | Liguori | May 17, 1932 |
| 2,658,114 | Buhrendorf | Nov. 3, 1953 |
| 2,677,019 | Buhrendorf | Apr. 27, 1954 |
| 2,740,110 | Trimble | Mar. 27, 1956 |
| 2,785,233 | Stuart | Mar. 12, 1957 |
| 2,849,703 | Bindon et al. | Aug. 26, 1958 |
| 2,891,236 | Eisenberg | June 16, 1959 |

FOREIGN PATENTS

| | | |
|---|---|---|
| 1,117,701 | France | May 25, 1956 |